Patented June 27, 1933

1,915,911

UNITED STATES PATENT OFFICE

HUGH E. ALLEN, OF CHICAGO, ILLINOIS, ASSIGNOR OF ONE-HALF TO ALBERT G. McCALEB, OF EVANSTON, ILLINOIS

DRY NATURAL FRUIT FLAVORING MATERIAL

No Drawing.   Application filed January 31, 1930. Serial No. 425,077.

My invention contemplates and provides a dry pulverulent flavoring material composed essentially of sugar and the entirety of natural fruits,—a novel flavoring material which may be used for flavoring and coloring a great variety of food products, as for instance beverages, sherbets and water ices, ice creams, pastries, pastry coatings and icings, jellies, jelly powders, chewing gums and confections.

Thus far, as commercially produced, the flavoring material of my invention usually has been made from strawberries, raspberries and/or cherries, but it will be understood that the invention is by no means restricted to the use of these particular small fruits.

One of the salient characteristics of the flavoring material of this invention is the fact that the natural fruit pulp is reduced to a degree of fineness equal to that of commercial pulverized sugar,—a degree of fineness to which, so far as I am aware, it is impossible to reduce natural fruit pulp by any method save that hereinafter described.

When the flavoring material is in the dry condition in which it is made and sold, these minute particles of natural fruit pulp are practically indistinguishable from the particles of pulverized sugar with which they are associated and thoroughly intermixed. But when the flavoring material comes into contact with moisture, these minute particles of fruit pulp expand to many times their former size, and are thus readily distinguished from the sugar, even though the latter remained undissolved (in some uses of the flavoring material the sugar remains substantially undissolved, in other instances the sugar is entirely or substantially dissolved).

Thus a beverage made from the flavoring material of my invention is not only characterized by the color and flavor of the natural fruit employed, but in addition it carries in suspension what appears to be a myriad of small and readily distinguishable particles of natural fruit pulp. Similarly, in cake icings (whether water icings or fat or oil icings) made with the material of the present invention, particles of natural fruit pulp (corresponding in size to the head of a very small pin) are distributed throughout the icing to add to its appearance as well as to its palatability and food value.

Heretofore it has been the custom to flavor food products of the kinds mentioned in the first paragraph hereof with liquid fruit flavors or imitation fruit oils. Sometimes a relatively dry flavoring material has been prepared by mixing any of the liquid flavorings just mentioned with sugar and then permitting or causing the mixture to dry. But no such flavoring material, whether of the wet variety or the dry variety, has contained the very minute particles of natural fruit pulp which are the salient feature of the product of the present invention.

According to my invention, I add approximately six parts (by weight) of coarse granulated cane sugar to four parts of whole fresh fruit, which may of any desired variety. Strawberries, raspberries and cherries, however, are the most suitable of the common fruits for my purpose. This preparation is then evaporated in a vacuum cooker at a temperature not to exceed 135 degrees Fahrenheit until a semi-liquid preserved fruit product is obtained,—a product substantially like ordinary pure fruit preserves. This product is then removed to an agitating steam-vacuum crystallizer and heated again to a temperature not to exceed 135 degrees Fahrenheit until all noticeable moisture is removed.

Unless the temperature is retained at or below 135 degrees Fahrenheit, some of the natural flavor and color of the natural fruit will be lost, and the granulated sugar may lose wholly or partially its important fruit cutting characteristic, presently to be mentioned.

The dry material taken from the crystallizer is now placed in a so-called "hammer mill" i. e. a mill wherein the material under treatment is repeatedly brought between the rapidly and sharply engaging faces of small hammers or small hammers and anvils. The result of this operation is rapidly to reduce the sugar, which initially is in the form of relatively large, hard crystals, to a pulverized state and at the same time to reduce the evaporated fruit to a degree of fineness comparable to the fineness of pulverized sugar,—a degree of fineness far beyond that to which any fruit may be reduced by any chopping or milling operation other than that herein described.

In grinding mills, hammer mills, or chopping mills, it is impossible to reduce fruits to a degree of fineness in any way comparable to the fineness of pulverized sugar, because the fruit becomes a matted cohesive mass before approaching the fineness of pulverized sugar. But when the fruit is treated in a hammer mill in the presence of a substantial quantity,—preferably a major quantity,—of granulated sugar, the fruit reduces with and to substantially the same degree of fineness as the sugar. This is due undoubtedly to the fact that the fruit is actually cut by and against the sharp edges of the sugar crystals as the latter are hammered and reduced. I believe I am the first to appreciate and utilize the fruit cutting possibilities of sugar crystals in reducing mixtures of sugar and fruit to a degree of fineness to which it is practically impossible to reduce the fruit alone by any milling or chopping method heretofore employed.

The flavoring material of my invention is dry and pulverent. It can be manufactured economically, and may be marketed in containers which are not necessarily hermetically sealed, without danger of spoilage or deterioration.

As above explained, the flavoring material of the present invention is usually made from the common small red fruits, viz., strawberries, raspberries and small tart red cherries. When made from these particular fruits, the flavoring material, in the form in which it is marketed, is of a light pink color. But when moistened, the material immediately assumes the dark red color of the natural fruit and, of course, the very minute particles of fruit pulp immediately increase in size, as above explained.

While I prefer to utilize merely sugar and pure fruit (either fresh or dehydrated) in the manufacture of the flavoring material of my invention, I may add fruit color or fruit acid, if desired.

Having thus described my invention, what I claim is new and desire to secure by Letters Patent of the United States is:

1. The method which consists in adding a major quantity of coarse granulated sugar to a minor quantity of whole fruit, heating the aforesaid in vacuo at a temperature not exceeding 135 degrees Fahrenheit until a semi-liquid material is obtained, crystallizing said semi-liquid material in vacuo at a temperature not exceeding 135 degrees Fahrenheit, and then sharply and rapidly hammering the resultant dry material until the fruit has been reduced by and with the sugar to a pulverulent state.

2. The method of manufacturing fruit flavoring powders which comprises reducing fruit mixed with sugar to a syrup, reducing the moisture content by evaporating this syrup below 135° F., steam crystallizing the sugar content of the syrup, further reducing the moisture content thereof by evaporation carried on below 135° F. to obtain a relatively dry mass, and subjecting this mass to percussive grinding.

3. The method of preparing fruit flavoring powder which comprises partially removing moisture from a mixture of fresh fruit and coarse sugar by evaporation carried on below 135° F., crystallizing the sugar content of the mixture, removing the remaining traces of moisture by evaporation, and pulverizing the fruit content of the mixture by hammering the sugar crystals until the latter are reduced also to pulverized state.

In witness whereof, I hereunto subscribe my name this 27th day of January, 1930.

HUGH E. ALLEN.